United States Patent [19]

Aihara et al.

[11] Patent Number: 5,533,387
[45] Date of Patent: Jul. 9, 1996

[54] METHOD OF EVALUATING SILICON WAFERS

[75] Inventors: Ken Aihara, Annaka; Yutaka Kitagawara, Takasaki; Takao Takenaka, Annaka, all of Japan

[73] Assignee: Shin-Etsu Handotai Co., Ltd., Tokyo, Japan

[21] Appl. No.: 528,007

[22] Filed: Sep. 14, 1995

[30] Foreign Application Priority Data

Sep. 16, 1994 [JP] Japan .................................. 6-248458

[51] Int. Cl.⁶ .................................................. G01B 7/34
[52] U.S. Cl. ............................. 73/105; 364/507; 364/561
[58] Field of Search .............................. 73/105; 364/507, 364/560–563

[56] References Cited

U.S. PATENT DOCUMENTS 5,418,363 5/1995 Elings et al. ......................... 73/105 X
5,476,006 12/1995 Fujii et al. ............................... 73/105
5,497,656 3/1996 Kado et al. .............................. 73/105

Primary Examiner—Thomas P. Noland
Attorney, Agent, or Firm—Ronald R. Snider

[57] ABSTRACT

The height $x_i$ (i=1, 2, . . . , N) of a plurality of measuring points on a silicon wafer from a reference plane is measured by means of an AFM (atomic force microscope), the autocorrelation function $R_j$ represented by the equation below is determined:

$$R_j = \frac{1}{N-j} \sum_{i=1}^{N-j} (x_i - \bar{x})(x_{i+j} - \bar{x}) \quad (j = 0, 1, \ldots, N-1)$$

Where $\bar{x}$ denotes:

$$\bar{x} = \sum_{i=1}^{N} \frac{x_i}{N}$$

is determined, an arbitrary number of autocorrelation function $R_j$ with large value from said autocorrelation function $R_j$ are selected, and the microroughness on said silicon wafer is analyzed based on the distances between the point $R_{j=0}$ and said selected points $R_j$'s with large value except for $R_{j=0}$. +EA

3 Claims, 3 Drawing Sheets

METHOD OF EVALUATING SILICON WAFERS

RELATED APPLICATIONS

This application claims the priority of Japanese Patent Application No. 6-248458 filed on Sep. 16, 1994, which is incorporated herein by reference.

BACKGROUND OF THE INVENTION

1. Field of the Invention

This invention relates in general to a method of evaluating silicon wafers and more particularly to a method of evaluating the crystal quality near surface of silicon wafers by means of a microroughness analysis.

2. The Prior Art

A silicon wafer used for manufacturing semiconductor integrated circuits has a device(s) formed on and near surface thereof. The flatness of the surface, an active area of the device(s) is formed thereon, of the silicon wafer is crucial in both macroscopic and microscopic levels. As unevenness at the atomic level, called microroughness, is believed to be reflected by the crystal quality, this microroughness has been evaluated using various techniques.

The microroughness of a silicon wafer surface gets worse after the treatment with a cleaning solution composed of aqueous solution of ammonium hydroxide ($NH_4OH$) and hydrogen peroxide ($H_2O_2$). Such change of the microroughness after the treatment with a cleaning solution having a relatively weak etching effect on silicon wafers is believed to be reflected by the crystal quality.

However, this etching effect of the cleaning solution is so weak that a technique to detect the microroughness with high sensitivity is required. Moreover, a technique with capability to measure the order of atomic level is required.

An atomic force microscope (hereafter referred to as "AFM") and a scanning tunnelling microscope (hereafter referred to as "STM") are used in techniques for the measurement of the microroughness of silicon wafers in the order of atomic level. An AFM detects the microscopic forces between atoms and a probe, typically van der Waals forces, and detects changes in such forces due to minute differences in the distances between atoms and the probe to determine the surface unevenness.

Since an AFM is capable of very accurately measuring unevenness without destruction of the surface of the specimen, it is ideal for measuring the microroughness. The microroughness obtained by AFM is usually represented by RMS (root mean square), P-V (peak to valley) and so on. Assuming $x_i$ ($i=1, 2, \ldots, N$) to be the height of one of N measurement points from the reference plane, RMS is expressed by the following equation:

$$RMS = \sqrt{\frac{\sum\limits_{i=1}^{N}(x_i - \bar{x})^2}{N}}$$

Where $\bar{x}$ denotes:

$$\bar{x} = \sum_{i=1}^{N}\frac{x_i}{N}$$

P-V is expressed by the following equation:

$$P-V = [x_i]_{max} - [x_i]_{min}$$

Where $[x_i]_{max}$ is the maximum of $x_i$ and $[x_i]_{min}$ is the minimum of $X_i$.

As a prior art for the microroughness change evaluation of silicon wafers after the treatment with a cleaning solution having a composition of $NH_4OH/H_2O_2/H_2O=1:1:5$, T. Ohmi et al. reported the relationship between the microroughness and the crystal quality of various samples including Czochralski grown crystals, float zoned crystals and epitaxial grown crystals using average roughness (Ra).

Here, Ra is a microroughness evaluation similar to RMS, as shown in the following equation:

$$R_a = \frac{\sum\limits_{i=1}^{N}|x_i - \bar{x}|}{N} \quad (i=1, 2, \ldots, N)$$

Where $\bar{x}$ denotes:

$$\bar{x} = \sum_{i=1}^{N}\frac{x_i}{N}$$

The evaluation method described above takes measurements in a scanning area of a prescribed size at several points. RMS value is shown to change differently depending on the types of silicon crystals when the microroughness measurements are carried out on a silicon wafer using different sizes of scanning area.

FIG. 3 shows the relationship between the size of the scanning area (horizontal axis) and RMS (vertical axis) in the evaluation method described above. In this figure, the samples represented by circles have a haze level of 7 (BIT) without a heat treatment, the samples represented by squares have a haze level of 16 (BIT) with 20 minutes of a heat treatment at 1000° C., and the samples represented by triangles have a haze level of 107 (BIT) with several hours of a heat treatment at 1100° C. "Haze level" is an indicator of the microroughness obtained by an optical method, and a larger haze level values indicates more rough surface. As shown in the figure, the RMS value changes depending on the size of the scanning area and a good correlation with the haze level cannot be obtained.

The evaluation method described above has to be a microroughness evaluation based on RMS or Ra using a certain fixed size of the scanning area. However, such a RMS microroughness evaluation with a fixed size of the scanning area is not an appropriate evaluation of the crystal quality because it is not comprehensive. That is, because the scanning area of the AFM measurement is very small, it is difficult to grasp the silicon surface configuration with a calculation method such as RMS.

On the other hand, the microroughness of a silicon wafer surface affects the dielectric breakdown properties of an oxide layer. However, the evaluation of dielectric breakdown properties with a fabricating MOS structure on a silicon wafer surface requires complicated and time consuming process such as oxidation or formation of electrodes.

BRIEF SUMMARY OF THE INVENTION

The object of the present invention is to solve the problems described above and its objective is to detect with high sensitivity changes in the surface configuration of a silicon wafer and thus to provide a method of evaluating the crystal quality of silicon wafers.

The present invention evaluates the crystal quality of silicon wafers by measuring the height $x_i$ ($i=1, 2, \ldots, N$) of a plurality of measuring points on a silicon wafer from a reference plane by means of an AFM, determining the autocorrelation function $R_j$ represented by:

$$R_j = \frac{1}{N-j} \sum_{i=1}^{N-j} (x_i - \bar{x})(x_{i+j} - \bar{x}) \quad (j = 0, 1, \ldots, N-1)$$

wherein $\bar{x}$ denotes:

$$\bar{x} = \sum_{i=1}^{N} \frac{x_i}{N}$$

selecting an arbitrary number of autocorrelation function $R_j$ with large value, and analyzing the microroughness on said silicon wafer based on the distances between the point $R_{j=0}$ and said selected points $R_j$'s with large value except for $R_{j=0}$. "An arbitrary number" mentioned above is not limited in particular, but a number which is 2 or more and allows processing with a computer would be practical.

Said silicon wafers should preferably be treated with a cleaning solution composed of ammonium hydroxide ($NH_4OH$), hydrogen peroxide ($H_2O_2$) and water before said measurement with the AFM is conducted. The ratio of $NH_4OH:H_2O_2:H_2O$ in said cleaning solution should preferably be 1:1:5.

The present invention is focused on the periodicity of the microroughness on a silicon wafer surface revealed by the AFM measurement, uses the autocorrelation function to observe the surface configuration between each silicon crystal and thus evaluates the crystal quality.

The periodicity of the microroughness on silicon wafer surface has not been studied at all. However, the inventors discovered that the microroughness has a periodic nature. Consequently, although the microroughness has been believed to be random unevenness, it has become possible, by analyzing the correlation between each unevenness using the autocorrelation function, to evaluate the microroughness in the atomic level measured by an AFM as a periodic function.

DETAILED DESCRIPTION

Examples of the present invention are described below. CZ silicon single crystal wafers grown by different crystal pulling speeds (wafers grown by a low pulling speed of 0.4 mm/min and wafers grown by a high pulling speed of 1.1 mm/min) were dipped in a cleaning solution ($NH_4OH:H_2O_2:H_2O=1:1:5$) for 0, 30, 60 and 90 minutes.

An AFM was used to measure the height $x_i$ (i=1, 2, ..., N) of a plurality of measuring points on each silicon wafer from a reference plane, and the autocorrelation function $R_j$ represented by the equation below was obtained:

$$R_j = \frac{1}{N-j} \sum_{i=1}^{N-j} (x_i - \bar{x})(x_{i+j} - \bar{x}) \quad (j = 0, 1, \ldots, N-1)$$

Where $\bar{x}$ denotes:

$$\bar{x} = \sum_{i=1}^{N} \frac{x_i}{N}$$

5 points with large value except for $R_{j=0}$ were selected to obtain their relative powers from among the autocorrelation function $R_j$'s. For each of the selected 5 points, the correlation distance was calculated as a distance between the point $R_{j=0}$ and the selected $R_j$ point with large value. Finally, the relationship between the correlation distance and the relative power for the wafers grown by the low pulling speed (0.4 mm/min) is shown in FIG. 1 and such relationship for the wafers grown by the high pulling speed (1.1 mm/min) is shown in FIG. 2.

Figure 1:
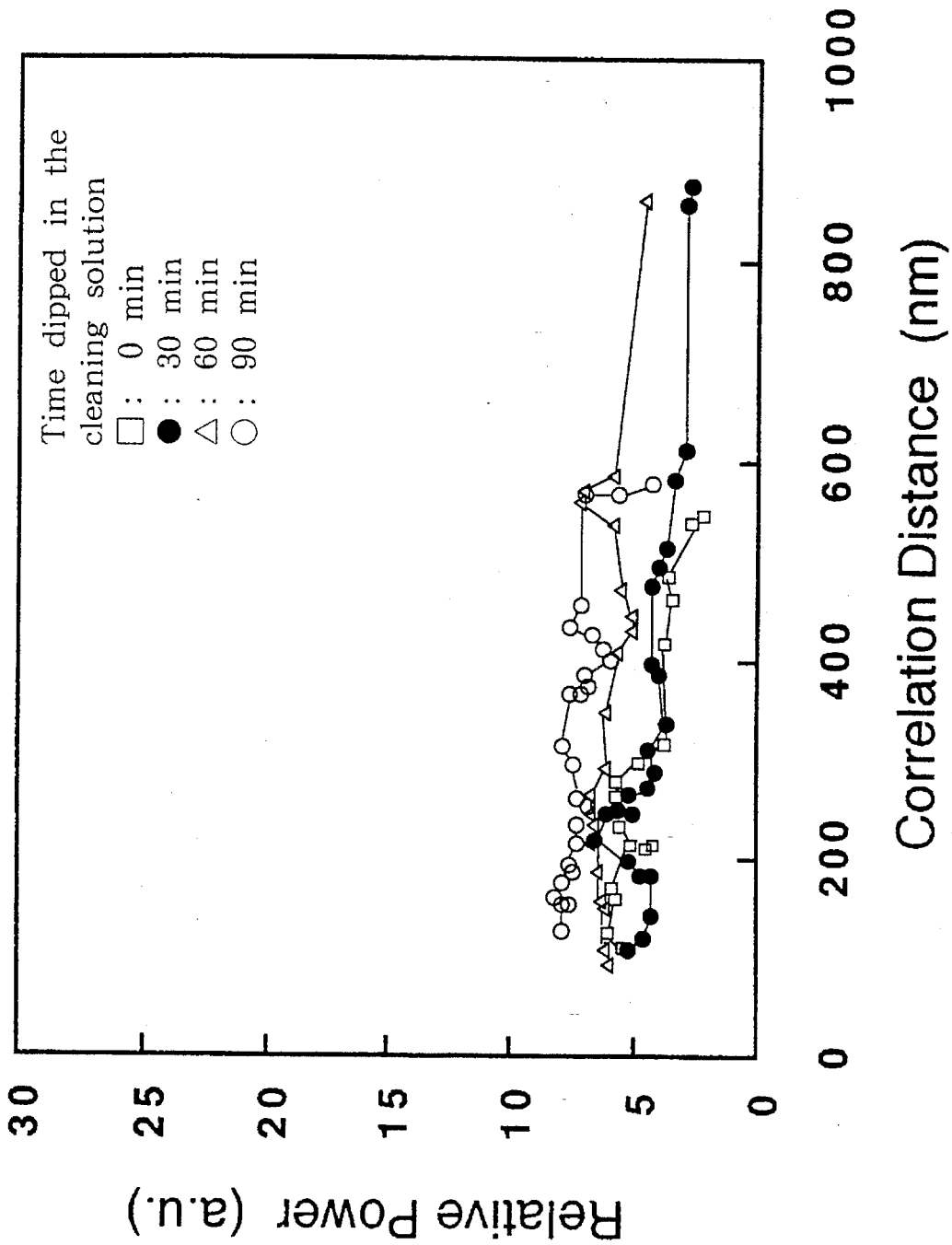
FIG. 1 is a graph showing the periods of the microroughness and relative power for wafers with the low pulling speed.
Figure 2:
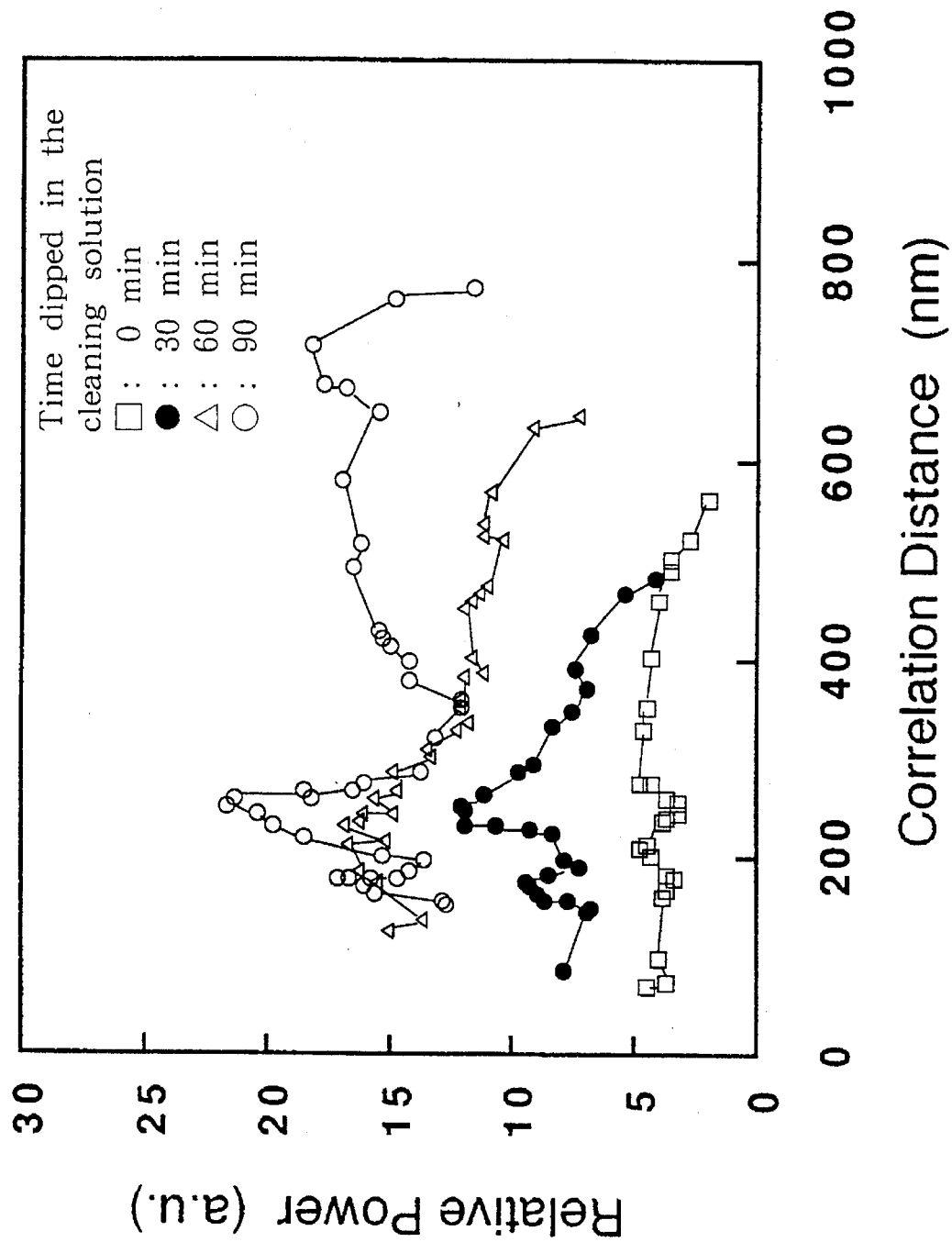
FIG. 2 is a graph showing the periods of the microroughness and relative power for wafers with the high pulling speed.
Figure 3:
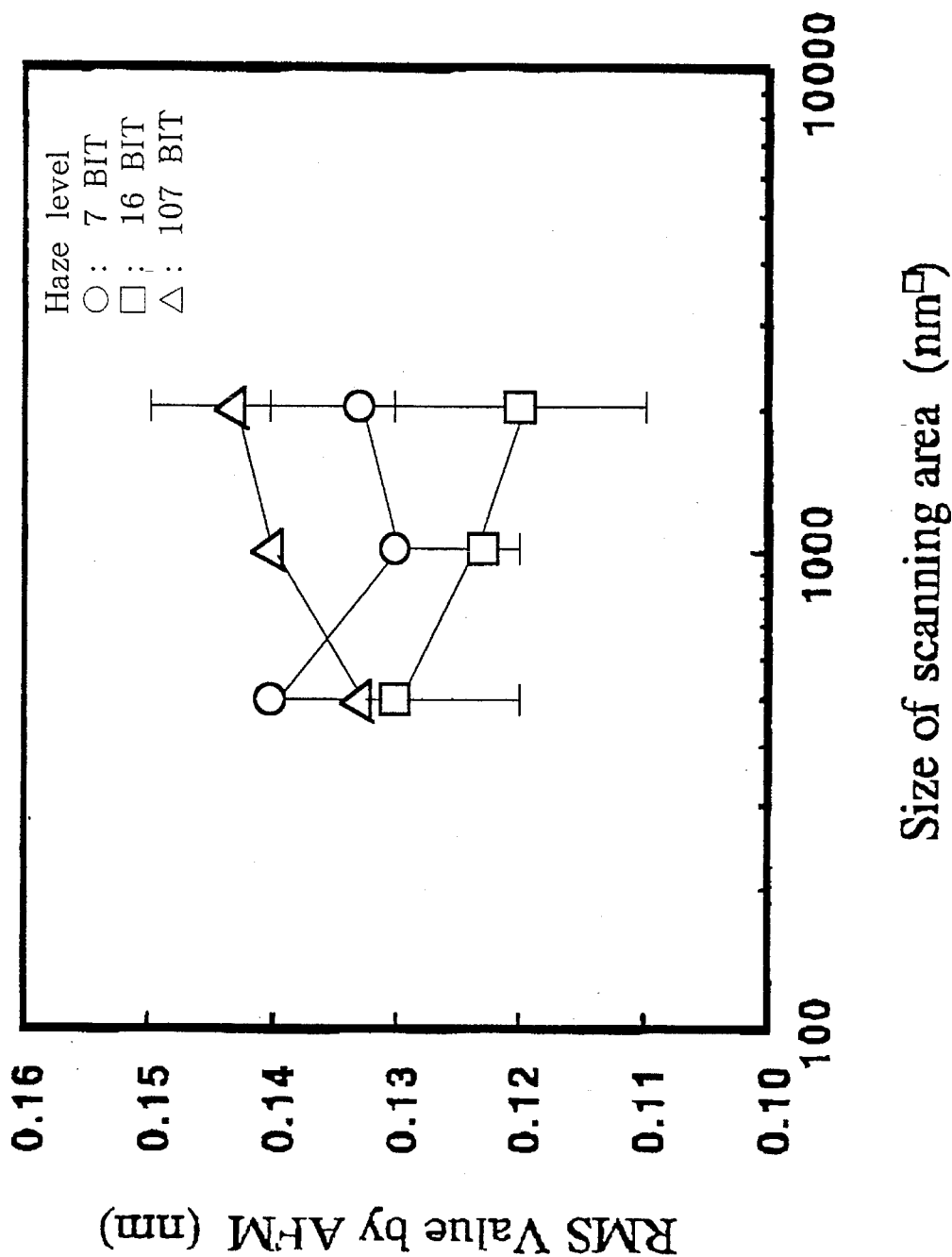
FIG. 3 is a graph showing the relationship between the size of the scanning area and RMS in the evaluation of the microroughness of silicon wafers using RMS of the AFM measurements.

The horizontal axis of FIG. 1 and FIG. 2 represents the correlation distance, i.e. the period of the microroughness, and the vertical axis represents the value of the autocorrelation function $R_j$, i.e. the strength of correlation for that period. A stronger correlation indicates that the microroughness at specific period gets worse more greatly. As shown in FIG. 2, the microroughness of its correlation distance being 400 nm or less gets worse much more rapidly in the case of the wafers grown by high pulling speed. On the contrary, as shown in FIG. 1, the microroughness of any typical period show no aggravation in the case of the wafers grown by low pulling speed. This is believed to indicate that the wafers grown by the low pulling speed are harder to be etched upon by said cleaning solution and have a relatively good crystal quality.

As shown in the aforementioned results, there is a close relationship between the crystal manufacturing conditions of wafers and aggravation of the microroughness, and this evaluation method can detect the crystal quality near the surface of the silicon wafer with high sensitivity and thus replace the conventional evaluation method measuring dielectric breakdown voltage of an oxide layer which is complicated and time consuming.

As described thus far, the present invention, by taking the periodicity of the microroughness on a silicon wafer into account, can detect with high sensitivity changes in the surface configuration of the silicon wafer which could not be detected with conventional methods and makes it possible to evaluate the crystal quality near the surface of the silicon wafer. The present invention also allows acquisition of information about periods of the microroughness developed due to a treatment using a cleaning solution comprising a mixed aqueous solution of ammonium hydroxide and hydrogen peroxide. The evaluation can be done in a relatively short period of time without complicated procedures such as are required in the evaluation of the dielectric breakdown voltage of an oxide layer.

What is claimed is:

1. A method of evaluating silicon wafers which evaluates the crystal quality of silicon wafers by measuring the height $x_i$ (i=1, 2, ..., N) of a plurality of measuring points on the principal plane of a silicon wafer from a reference plane by means of an atomic force microscope (hereafter referred to as "AFM"), determining the autocorrelation function $R_j$ represented by $$R_j = \frac{1}{N-j} \sum_{i=1}^{N-j} (x_i - \bar{x})(x_{i+j} - \bar{x}) \quad (j = 0, 1, \ldots, N-1)$$

wherein $\bar{x}$ denotes:

$$\bar{x} = \sum_{i=1}^{N} \frac{x_i}{N}$$

selecting an arbitrary number of autocorrelation function $R_j$ with large value from said autocorrelation function $R_j$, and analyzing the microroughness on said silicon wafer based on the distances between the point $R_{j=0}$ and said selected points $R_j$'s with large value except for $R_{j=0}$.

2. A method of evaluating silicon wafers as described in claim 1 wherein said silicon wafers are treated with a cleaning solution composed of ammonium hydroxide ($NH_4OH$), hydrogen peroxide ($H_2O_2$) and water before said measurement with the AFM is conducted.

3. A method of evaluating silicon wafers as described in claim 2 wherein the ratio of $NH_4OH:H_2O_2:H_2O$ in said cleaning solution is 1:1:5.

\* \* \* \* \*